United States Patent [19]
Hunter

[11] Patent Number: 5,697,328
[45] Date of Patent: Dec. 16, 1997

[54] THERAPEUTIC COLLAR FOR BIRDS

[76] Inventor: Doris C. Hunter, 8418 N. Jones Ave., Unit 1, Tampa, Fla. 33604

[21] Appl. No.: 354,947

[22] Filed: Dec. 13, 1994

[51] Int. Cl.⁶ .................................................. A01K 37/00
[52] U.S. Cl. .................................................... 119/714
[58] Field of Search .............................. 119/712, 713, 119/714, 729, 850, 853, 855, 865, 815, 816; 54/18.1, 18.2, 19.1; 128/876, 878, 882; 602/60, 62, 75, 64, 66

[56] References Cited

U.S. PATENT DOCUMENTS

| | | | |
|---|---|---|---|
| 950,143 | 2/1910 | Saxe | 602/64 X |
| 3,036,554 | 5/1962 | Johnson | 119/815 X |
| 3,529,601 | 9/1970 | Kirkland | 602/60 X |
| 4,091,766 | 5/1978 | Colliard | 119/865 X |
| 4,598,666 | 7/1986 | Spanko | 119/855 |
| 5,168,577 | 12/1992 | Dety | 602/62 X |
| 5,307,764 | 5/1994 | Moy | 119/855 X |

Primary Examiner—Thomas Price
Attorney, Agent, or Firm—Stein, Pendorf & Van Der Wall

[57] ABSTRACT

A new and improved therapeutic collar for birds comprising, in combination, an sheet formed in a rectangular configuration having a first vertical end edge, a second vertical end edge, an upper horizontal end edge, a lower horizontal end edge, a front face and a rear face. The sheet has a linear width and height. The linear width being between 1.8 and 3.0 times the height. The sheet is formed into a cylindrical configuration when the first vertical end edges and the second vertical end edge are overlapped and coupled with a fastener means at opposite end edges. The end edges are releasable coupled therebetween. The sheet is resilient in its circumference when formed in a cylinder but sufficiently rigid with a high-beam strength to preclude bending of the sheet in the direction of the axis of the cylinder. A fabric covers the circumference of the sheet for softness of contact between the collar and the neck of a bird to which it is applied.

11 Claims, 4 Drawing Sheets

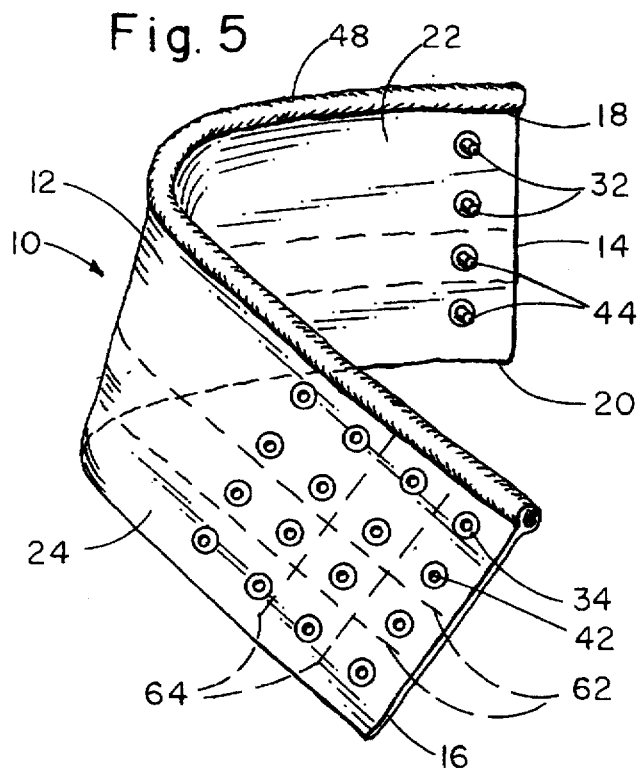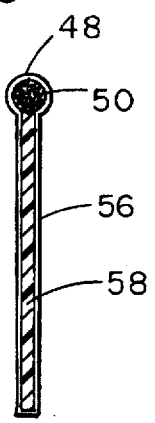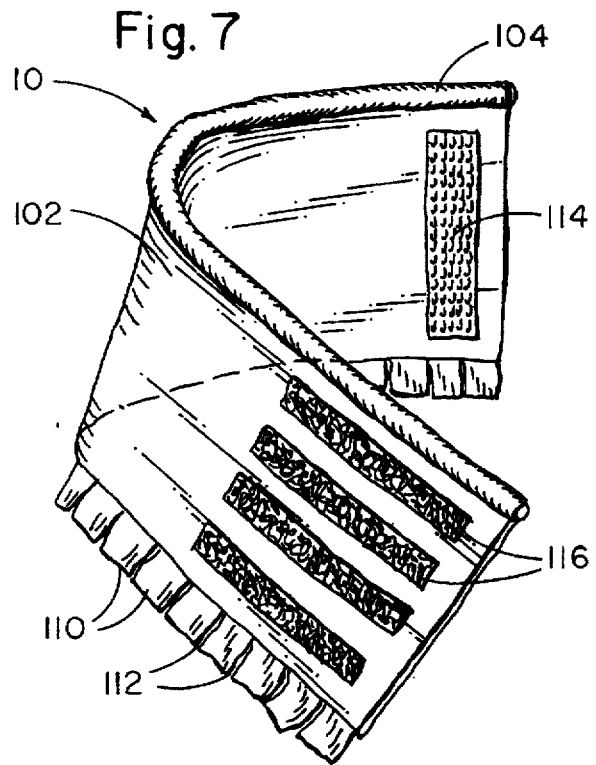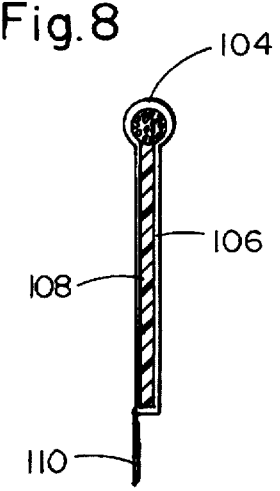

THERAPEUTIC COLLAR FOR BIRDS

BACKGROUND OF THE INVENTION

1. Field of the Invention

This invention relates to a therapeutic collar for birds and, more particularly, to reducing stress in birds through a collar to preclude feather plucking or picking at wounds, stitches, injuries and the like.

2. Description of the Background Art

Feather picking or plucking is an obsessive, destructive behavior pattern of all birds during certain circumstances. During feather picking the feathers are methodically pulled out, amputated, frayed, or damaged in some way or another. This behavior often prevents normal feather growth and emergence.

Stress is the main reason a bird becomes a feather plucker. Stress in birds may be caused by sexual picking, internal disease, malnutrition, boredom, nervousness, Giardia, bacteria, yeast, or fungus infection in the feather follicles. Other causes may include parasites, hormonal imbalances, viruses, or overzealous mate preening or the like.

Bird lovers know that feather plucking and self-mutilation can occur at any time and for any reason. Stress, for the reasons listed above, is the main cause. Therefore, a method of or apparatus for restraining the bird with out increasing stress levels is imperative.

Presently, there are patents addressing the problem of animals inflicting self injury by biting, scratching, or chewing themselves. Many of these patents are designed to prevent head turning by restraining the head of large animals such as dogs and cats. By way of example, one such device is U.S. Pat. No. 3,036,554, to F. L. Johnson, relating to protective devices for animals referred to as Elizabethan Collar.

The Elizabethan Collar is a disk shaped device that fastens around the animals's neck and extends in a forward direction one to two inches beyond the animals's nose. A disadvantage of this invention is the cone shape holder cannot be operated as a stand alone device. Additionally, the Elizabethan Collar is bottom-heavy. Wearing the collar makes it difficult for the bird to hold its head up or to walk with any degree of comfort. Some birds, in an effort to remove the collar, lie down, flail about in seizure-like fashion. The worst cases of collar rejection are when the bird behaves in a frenzied and panicked flopping manner and, even worse, when the bird chews the rubber protective neck guard causing lacerations to the bird's neck by underlying sharp polymeric material.

Other prior art patents exist as the efforts are continuing to improve the art in the area of animal restraining collars and animal protective collars. Consider for example, U.S. Pat. No. 439,598 to W. W. Huntoon & A. F. Perkins, relating to horse neck poke; U.S. Pat. No. 3,013,530 to W. V. Zeman, relating to animal restraining device; U.S. Pat. No. 4,286,547 to Robert E. Neubauer and Gunther B. Niemann, relating to animal restraint unit; U.S. Pat. No. 4,476,814 to Marie Z. Miller, relating to animal pet medical collar; U.S. Pat. No. 4,598,666 to Jacob E. Spanko, relating to feline protective garment; U.S. Pat. No. 4,719,876 to Frank T. Wilken, relating to restraint collar; U.S. Pat. No. 5,012,764 to Therese A. Fick and Byron D. Fair, relating to animal protective collar; U.S. Pat. No. 5,218,928 to Kin C. Muck and Helen M. Chan, relating to avian restrainer; U.S. Pat. No. 5,307,764 to Kelly A. Moy, relating to protective pet collar; and U.S. Pat. No. 5,349,927 to Blair H. Campbell, relating to animal protective collar.

The large number of prior art patents illustrates the need for a therapeutic pet collar to meet the desired objectives. In such prior art devices the shape and weight of the above devices are cumbersome, uncomfortable, annoying and difficult for birds to accept. They tend to increase the stress levels of the birds and prolong the healing process by enhancing destructive behavior patterns.

Therefore, a need exist for development of a suitable collar to be worn about the neck of birds which will reduce stress levels and deter feather plucking.

As will become evident, nothing in the prior art provides the benefits and advantages attendant with the present invention.

Accordingly, it is an object of this invention to provide an improvement which overcomes the aforementioned inadequacies of the prior art devices and provides an improvement which is a significant contribution to the advancement of the art.

It is an object of this invention to maintain centered a therapeutic collar for animals which is light weight and does not restrict the birds ability to eat, drink, perch, climb, fly and the like.

It is an object of this invention to allow birds, to maintain their normal routine, while wearing a therapeutic collar.

Another object of this invention is to configure for more effective usage a collar with an enlarged bead at its upper end and an extended cover at its lower end, the extended cover has covers extending between the contact area between the collar and the bird.

Another object of this invention is to provide a new and improved therapeutic collar for birds comprising an sheet formed in a rectangular configuration. The sheet has a first vertical end edge, a second vertical end edge, an upper horizontal end edge and a lower horizontal end edge. The sheet has a front face, a rear face, a linear width and a linear height. The linear width is between two and three times the height. The sheet is adapted to form a cylindrical configuration when the first vertical end edge and the second vertical end edge are overlapped and coupled with a fastener means. The fastener means are on the opposite end edges for the releasable coupling therebetween. The sheet is resilient in its circumference when formed in a cylinder but sufficiently rigid with a high-beam strength to preclude the bending of the sheet in the direction of the axis of the cylinder. A fabric covers the sheet for softness of contact between the collar and the neck of the bird to which it is applied.

The foregoing has outlined some of the pertinent objects of the invention. These objects should be construed to merely illustrate some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an polymeric sheet formed in a rectangular configuration having a first vertical end edge, a second vertical end edge, an upper horizontal end edge, a lower horizontal end edge, a front face and a rear face. The polymeric sheet has a linear width and a linear height. The linear width has a ratio of about 1.8 and 3.0 times the height. The polymeric sheet is flexible and essentially inextensible. Male fasteners are on the front face of the polymeric sheet adjacent to the first vertical end edge. Female fasteners are on the rear face of the polymeric sheet adjacent to the second vertical end edge. The polymeric sheet is adapted to form a cylindrical configuration when the first vertical end edge and the second vertical end edge are overlapped and coupled by the fastener means at the opposite end edges. The fastener means form releasable couplings between the end edges. The polymeric sheet is resilient in its circumference when formed in a cylinder but, sufficiently rigid with a high-beam strength to preclude bending of the polymeric sheet in the direction of the axis of the cylinder. The female fasteners are formed as a grid of plural rows and columns of recesses on the rear face of the polymeric sheet along the second vertical end edge. The male fasteners are formed as a single column of projections on the front face of the polymeric sheet along the first vertical end edge and opposite the female fasteners. An enlarged bead is formed in a circular cylinder and traverses the upper horizontal end edge. The enlarged bead is resilient and capable of cushioning the contact of the upper horizontal end edge with the neck of a bird. The rear face has located thereon first trim zones and second trim zones. The first trim zones are horizontal and have lengths equal to the linear width of the polymeric sheet. The first trim zones are located in parallel planes between the rows of female fasteners. The second trim zones have vertical lengths equal to the linear height of the polymeric sheet. The second trim zones are located in parallel planes and between the columns of female fasteners. The second trim zones intersect the first trim zones forming a ninety degree angle at the point of intersection. The polymeric sheet and the bead have a fabric covering their circumference. The fabric's softness eases the contact between the collar and the neck of a bird to which it is applied.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is a perspective view of the therapeutic collar of FIG. 1 partially folded showing the front face and the rear face.

FIG. 6 is a cross-sectional side view of the structure as shown in FIG. 5.

FIG. 7 is a perspective view of an alternative embodiment of the therapeutic collar partially folded showing the front face and the rear face.

FIG. 8 is a cross-sectional side view of the structure as shown in FIG. 7.

Similar reference characters refer to similar parts throughout the several Figures.

DETAILED DESCRIPTION OF THE PREFERRED EMBODIMENT

Figure 1:
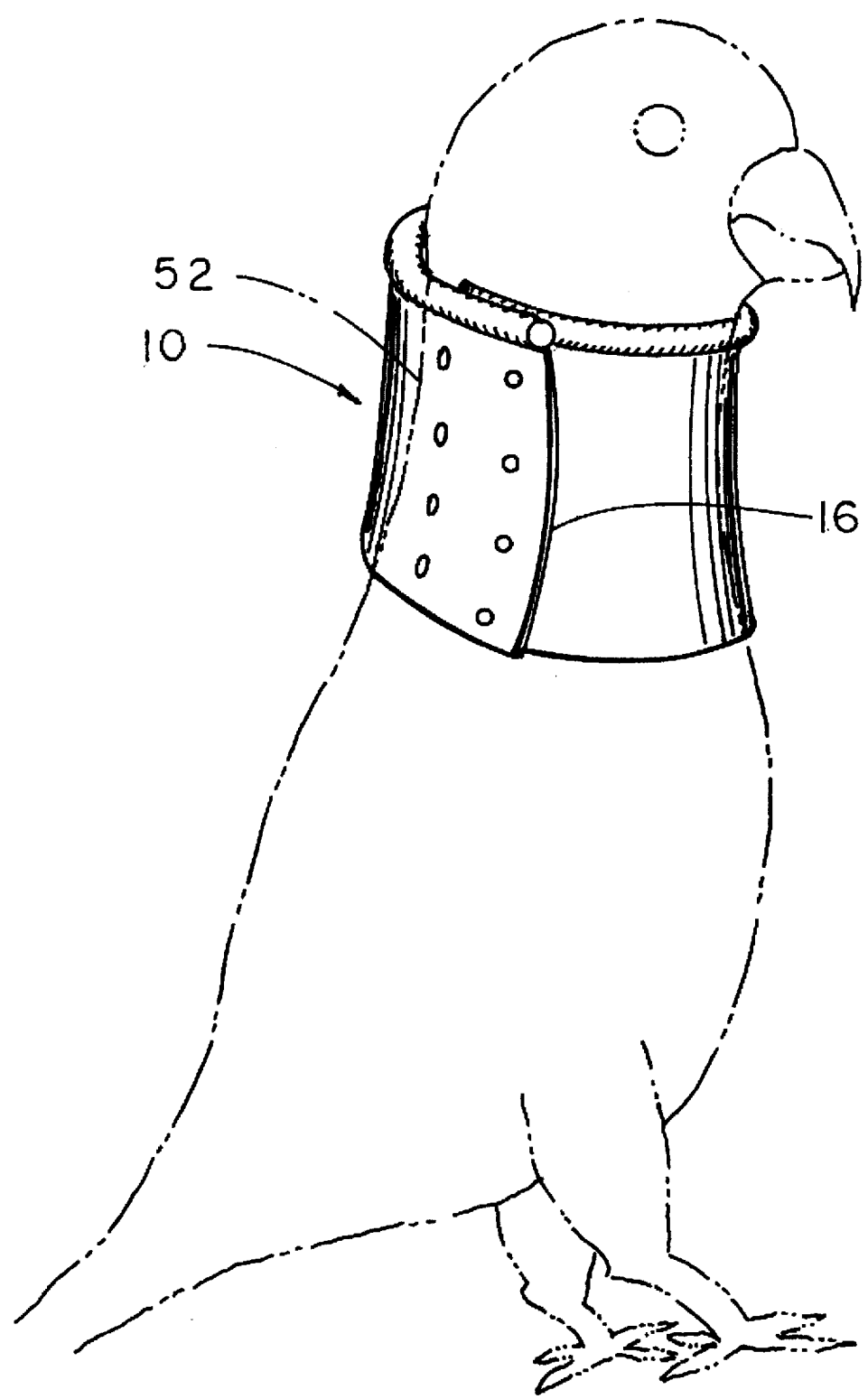
FIG. 1 is a perspective showing of the preferred embodiment of the therapeutic collar constructed in accordance with the principles of the present invention.

With reference now to the drawings, and in particular to FIG. 1 thereof, a new and improved therapeutic collar for birds embodying the principles and concepts of the present invention and generally designated by the reference numeral 10 will be described.

The present invention, the new and improved therapeutic collar for birds, is comprised of a plurality of components. Such components in their broadest context include an sheet, male fasteners, female fasteners, an enlarged bead and a fabric covering the sheet. Such components are individually configured and correlated with respect to each other so as to attain the desired objective.

Figure 2:
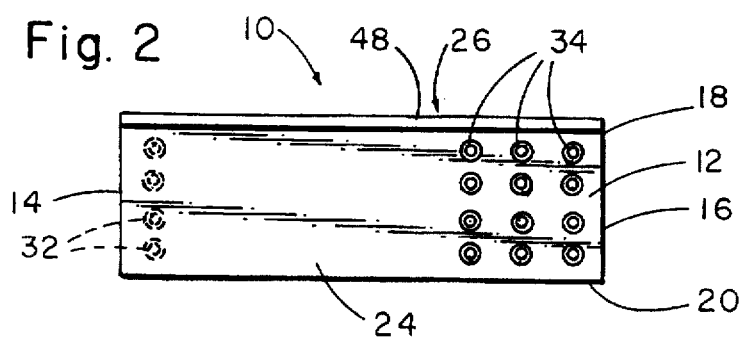
FIG. 2 is a plan view of the rear face of the therapeutic collar having the dimensions 6 inches by 2 inches.
Figure 3:
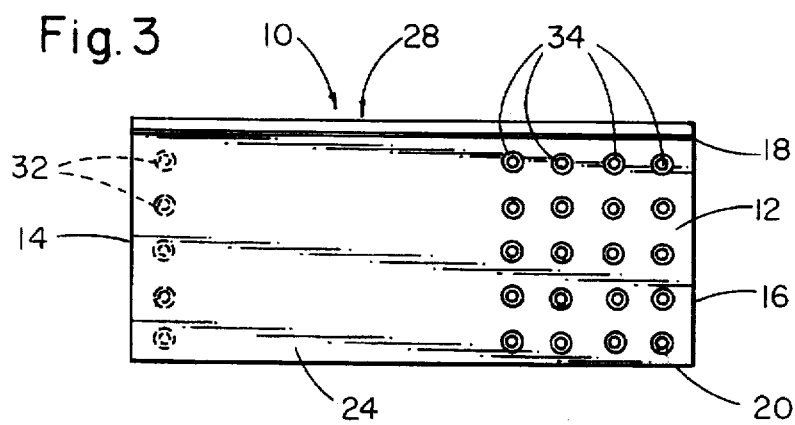
FIG. 3 is a plan view of the rear face of the therapeutic collar having the dimensions 7 inches by 3 inches.
Figure 4:
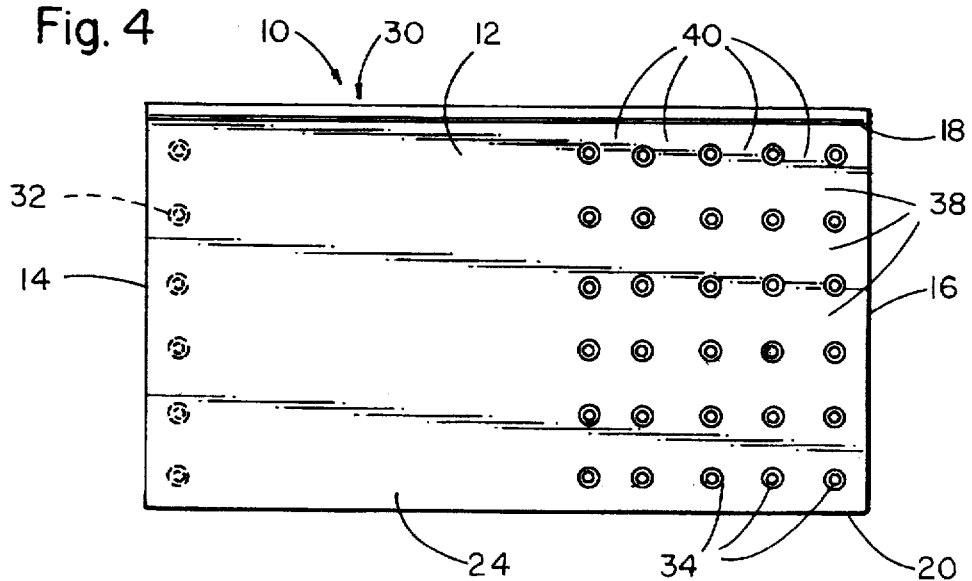
FIG. 4 is a plane view of the rear face of the therapeutic collar having the dimensions 9 inches by 5 inches.

More specifically, referring to FIGS. 2–4, the polymeric sheet 12 is formed in a rectangular configuration with a first vertical end edge 14, a second vertical end edge 16, an upper horizontal end edge 18, a lower horizontal end edge 20. It also has a front face 22 and a rear face 24. The polymeric sheet 12 has a linear width and a linear height. FIGS. 2–4 show varied sizes of the polymeric sheet 12 including a small member 26 shown in FIG. 2 which is about 6 by 2 inches (a 3 to 1 width to height ratio, a medium member 28 shown in FIG. 3 which is about 7 by 3 inches (a 2.3 to 1 width to height ratio), and a large member 30 shown in FIG. 4 which is about 9 by 5 inches (a 1.8 to 1 width to height ratio). The linear width of the polymeric sheet 12 thus has a width to height ratio between about 1.8 and 3.0.

The preferred material for the polymeric sheet is plastic, preferably, low density polyethylene. Polyethylene is a polymer of intermediate modulus of elasticity with a low molecular-weight. The polyethylene used is preferably characterized by its flexibility and is of the type used commercially in conventional squeeze bottles.

As shown in FIGS. 1–5, attached to the polymeric sheet are male fasteners 32 and female fasteners 34. Both types of fasteners extend through and are permanently secured to the polymeric sheet. The male fasteners 32 extend from the front face 22 of the polymeric sheet 12 adjacent to the first vertical end edge 14. The female fasteners 34 are operative from the rear face 24 of the polymeric sheet 12 adjacent to the second vertical end edge 16.

When the first vertical end edge 14 and the second vertical end edge 16 are overlapped, the polymeric sheet 12 is formed into the cylindrical configuration of FIG. 1. The overlapping of the first vertical end edge 14 and the second vertical end edge 16 allows coupling of the fastener means at the opposite end edges as shown in FIG. 1. The fastener means are releasable coupled between the first vertical end edge and the second vertical end edge. The polymeric sheet 12 is resilient in its circumference when formed in the cylindrical shape as shown in FIG. 1. Further, the polymeric sheet 12 is sufficiently rigid with a high-beam strength to preclude the bending of the polymeric sheet in the direction of the axis of the cylinder.

Still referring to FIGS. 1–5, the female fasteners are arranged in a grid pattern of rows 38 and columns 40. The grid pattern includes a plurality of rows and columns of recesses 42 on the rear face of the polymeric sheet 12. The female fasteners are located adjacent the second vertical end edge, and between the upper horizontal end edge and lower horizontal end edge. The male fasteners are projections 44. The projections 44 are arranged in a single column on the front face of the polymeric sheet 12. The column of male fasteners 32 is aligned along the first vertical end edge which is opposite the female fasteners 34 for selective coupling with one column of the female fasteners as a function of the size of the bird. The preferred embodiment for the fastener means is the snap type of fastener.

FIG. 5 shows, a perspective view of the therapeutic collar, having an enlarged bead 48 formed in a circular cylinder traversing the upper horizontal end edge of the polymeric sheet 12. FIG. 6, the cross-sectional view of FIG. 5, shows the preferred embodiment for the enlarged bead 48. Preferably a core of a synthetic foam 50 is used to form the enlarged bead. The foam allows the bead to be resilient and capable of cushioning the contact of the upper horizontal end edge with the neck 52 of a bird as shown in FIG. 1. If the bird attempts to bend or twist the head, the bead keeps the bird from feeling the hard edge of the polymeric sheet.

A fabric 56 is used to cover the circumference of the polymeric sheet and the enlarged bead 48. Use of the fabric allows the collar to eases the contact between the collar and the neck of a bird to which it is applied. The fabric 56 is of any material which is soft and washable, preferably, of the type used in commercial and conventional adhesive tape.

FIG. 6 shows a cross-sectional side view of FIG. 5. In the preferred embodiment the outer layer 56 is the soft fabric, the inner material of the sheet is a polymeric sheet 58. Attached to the upper horizontal end edge is the bead. The bead core is made of a synthetic foam 50.

From a functional standpoint, note is taken that the first trim zones 62 and second trim zones 64 lie in the extended linear spaces between the rows and columns of the female fasteners. The trim zones are clearly seen on FIG. 5 showing the rear face of the polymeric sheet. The first trim zones 62 have horizontal lengths equal to the linear width of the polymeric sheet. They are located in parallel planes above and between the rows of female fasteners. The second trim zones 64 have vertical lengths equal to the linear height of the polymeric sheet. They are located in a plane parallel and adjacent to the columns of female fasteners. The second trim zones intersects the first trim zones along an axis forming a ninety degree angle at the point of intersection. The user of the collar may cut or trim along a vertical line in one preselected trim zone to shorten the length of the collar. The user of the collar may cut or trim along a horizontal line in a preselected trim zone to decrease the width of the collar. In the preferred embodiment the barbed edge remaining from the vertical cut from being trimmed faces away from the body of the bird.

FIG. 7 and 8 show another embodiment of the present invention. The polymeric sheet 102 has the enlarged bead 104 member along the horizontal end edge. The polymeric sheet has an inner sheet 106 and an exterior cover 108 as in the prior embodiment. The exterior cover, however, has an extension 110 extending beyond the interior sheet for an increased distance. Additionally, there are vertical slots 112 extending uniformly from the lower horizontal end edge. The materials between the vertical slots 112 are flexible and such slots have an individual width of about ¼th of an inch. The vertical slots 112 are formed into the fabric covering the polymeric sheet. As such, fabric rectangles are formed at the bottom of the collar for resting on the lower part of the bird's neck for greater comfort.

In this embodiment instead of having snap fasteners, pile-type fasteners are utilized. The front face has a vertical strip of a pile-type fastener 114. The vertical strip of pile-type fastener is adjacent to the first vertical end edge of the front face. Along the rear face of FIG. 7 is a plurality of horizontal strips of a pile-type fastener 116. The horizontal strips are in parallel horizontal plans between the upper horizontal end edge and the lower horizontal end edge. This allows for an adjustable coupling. Use of the pile-type fasteners reduces the weight of the collar. It also allows for trimming of the collar for a more comfortable fit as in the prior embodiment.

FIG. 8 shows a cross-sectional view of the device of FIG. 7. In the preferred embodiment the outer layer is the soft fabric 108, the inner material is plastic 106. Attached to the upper horizontal end edge is the bead. The bead's core is made of a synthetic foam as in the prior embodiment. The vertical slot 110 is made of the fabric covering the polymeric sheet, also as in the prior embodiment.

Figure 9:
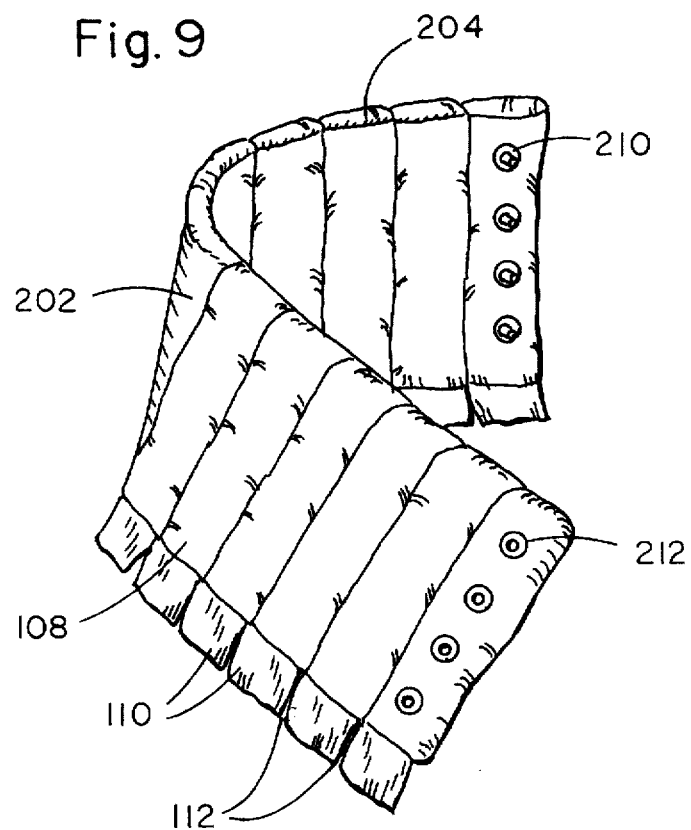
FIG. 9 is a perspective view of an alternative embodiment of the therapeutic collar partially folded showing the front face and the rear face.
Figure 10:
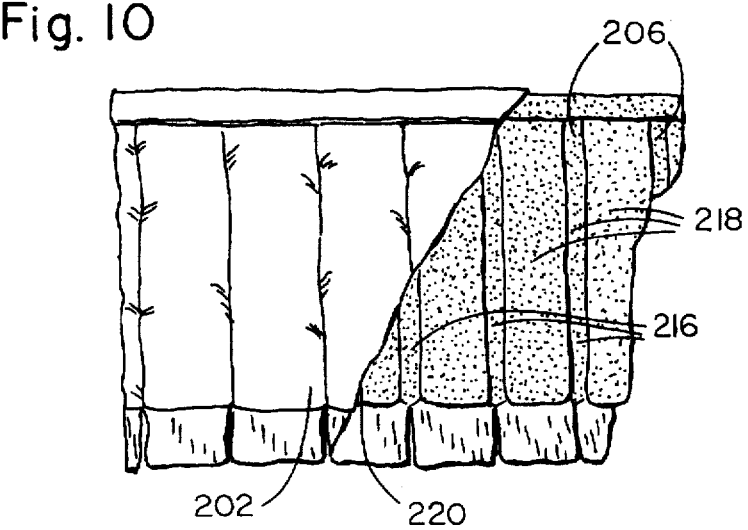
FIG. 10 is a sectional view of the front surface as shown in FIG. 9.

FIG. 9 and 10 show yet another embodiment of the present invention. In this embodiment the therapeutic collar is made of a sheet 202. The sheet is formed of individual vertically disposed discrete segments 204 with spaces 206 between the segments. The segments 204 have a width of about ⅛ inch. The spaces, about 1/16 inch, between segments allow the sheet to be comfortably wrapped around the neck of the bird. Absent from this embodiment is the enlarged bead 50 and 104 of FIGS. 5 and 7. The preferred material in this embodiment is card board, corrugated paper 216 with an adhesive 218 coupling the cardboard to the fabric and the fabric parts together where there is no cardboard. Included in this embodiment are vertical extensions 108 and vertical slots 110 The vertical extensions 108 traverse the horizontal end edge of the sheet 202. Additionally, there is only a single column of male fasteners 210 and female fasteners 212. Both fasteners are of the type shown in FIGS. 1–5. The male fasteners 210 are in a single column adjacent to the first vertical end edge of the front face. The female fasteners 212 are in a single column adjacent to the second vertical end edge of the rear face.

FIG. 10 shown a sectional cut front view of the embodiment depicted in FIG. 9. The parts are shown broken away to show the internal construction of embodiment in FIG. 9. The segments indicate there is the adhesive 218 used to secure the fabric 220 to the sheet 202.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A new and improved therapeutic collar for birds comprising, in combination:

a polymeric sheet formed in a rectangular configuration having a first vertical end edge, a second vertical end edge, an upper horizontal end edge, a lower horizontal end edge, a front face and a rear face, said polymeric sheet having a linear width and a linear height with the linear width having a ratio between about 1.8 and 3.0 times the height, the polymeric material being flexible and essentially inextensible;

male fasteners on the front face of the polymeric sheet adjacent to the first vertical end edge and female fasteners on the rear face of the polymeric sheet adjacent to the second vertical end edge, the polymeric sheet being adapted to be formed in a cylindrical configuration with an axis when the first vertical end edge and the second vertical end edge are overlapped and coupled by the male fasteners and female fasteners adjacent to the end edges for the releasable coupling therebetween, the polymeric sheet being resilient in its circumference when formed in a cylinder but sufficiently rigid with a high-beam strength to preclude the bending of the polymeric sheet in the direction of the axis of the cylinder;

the female fasteners being formed as a grid of plural rows and columns of recesses on the rear face of the polymeric sheet along the second vertical end edge, the male fasteners being formed as a single column of projections on the front face of the polymeric sheet along the first vertical end edge and opposite the female fasteners;

an enlarged bead formed in a circular cylinder traversing the upper horizontal end edge, the enlarged bead being resilient and capable of cushioning the contact of the upper horizontal end edge with the neck of a bird;

the rear face having located thereon first trim zones and second trim zones, the first trim zones having horizontal lengths equal to the linear width of the polymeric sheet and being located in parallel planes above and between the rows of female fasteners, the second trim zones having vertical lengths equal to the linear height of the polymeric sheet and being located in a plane parallel and adjacent to the columns of female fasteners, the second trim zones intersects the first trim zones along an axis forming a ninety degree angle at the point of intersection; and a fabric covering the circumference of the polymeric sheet and enlarged bead for softness of contact between the collar and the neck of the bird to which it is applied.

2. A new and improved therapeutic collar for birds comprising, in combination:

a sheet material formed in a rectangular configuration having a first vertical end edge, a second vertical end edge, an upper horizontal end edge, a lower horizontal end edge, a front face and a rear face, the sheet material having a linear width and a linear height with the linear width being between 1.8 and 3.0 times the height, the sheet material being formed in a cylindrical configuration with an axis when the first vertical end edges and the second vertical end edge are overlapped and coupled with a fastener means at the opposite end edges for the releasable coupling therebetween, the sheet material being capable of being resilient in its circumference when formed in a cylinder but sufficiently rigid with a high-beam strength to preclude the bending of the sheet material in the direction of the axis of the cylinder;

a fabric covering the circumference of the sheet material for softness of contact between the collar and the neck of a bird to which it is applied;

said fastener means comprising a male fastener on the first vertical end edge of the front face formed as a single column of projections and a female fastener on the second vertical end edge of the rear face formed as a grid of plural rows and columns of recesses; and the rear face of the collar having vertical trim zones parallel and adjacent to the columns of recesses and having horizontal trim zones parallel and above the rows of recesses.

3. A new and improved therapeutic collar for birds comprising, in combination:

a sheet material formed in a rectangular configuration having a first vertical end edge, a second vertical end edge, an upper horizontal end edge, a lower horizontal end edge, a front face and a rear face, the sheet material having a linear width and a linear height with the linear width being between 1.8 and 3.0 times the height, the sheet material being formed in a cylindrical configuration with an axis when the first vertical end edges and the second vertical end edge are overlapped and coupled with a fastener means at the opposite end edges for the releasable coupling therebetween, the sheet material being capable of being resilient in its circumference when formed in a cylinder but sufficiently rigid with a high-beam strength to preclude the bending of the sheet material in the direction of the axis of the cylinder;

a fabric covering the circumference of the sheet material for softness of contact between the collar and the neck of a bird to which it is applied; and said collar having an enlarged bead located on the upper horizontal end edge and vertical slots extending from the lower horizontal end edge of the fabric, the bead having a length equal to the linear width of the sheet material and the vertical slots together having a linear width of the sheet material.

4. The therapeutic collar as set forth in claim 3 wherein the bead is resilient and capable of cushioning the contact of the upper horizontal end edge with the neck of the bird and covered with the fabric covering the sheet material.

5. The therapeutic collar as set forth in claim 3 wherein the vertical slots extending in a downward direction along the lower horizontal end edge, being flexible and having an individual width of about ¼th of an inch, are formed from the fabric covering the sheet material.

6. A new and improved therapeutic collar for birds comprising, in combination:

a sheet material formed in a rectangular configuration having a first vertical end edge, a second vertical end edge, an upper horizontal end edge, a lower horizontal end edge, a front face and a rear face, the sheet material having a linear width and a linear height with the linear width being between 1.8 and 3.0 times the height, the sheet material being formed in a cylindrical configuration with an axis when the first vertical end edges and the second vertical end edge are overlapped and coupled with a fastener means at the opposite end edges for the releasable coupling therebetween, the sheet material being capable of being resilient in its circumference when formed in a cylinder but sufficiently rigid with a high-beam strength to preclude the bending of the sheet material in the direction of the axis of the cylinder;

a fabric covering the circumference of the sheet material for softness of contact between the collar and the neck of a bird to which it is applied; and the upper horizontal end edge of the collar being formed with an enlarged bead, said bead extending along the upper horizontal end edge of the sheet material.

7. A new and improved therapeutic collar for birds comprising, in combination:

a sheet material formed in a rectangular configuration having a first vertical end edge, a second vertical end edge, an upper horizontal end edge, a lower horizontal end edge, a front face and a rear face, the sheet material having a linear width and a linear height with the linear width being between 1.8 and 3.0 times the height, the sheet material being formed in a cylindrical configuration with an axis when the first vertical end edges and the second vertical end edge are overlapped and coupled with a fastener means at the opposite end edges for the releasable coupling therebetween, the sheet material being capable of being resilient in its circumference when formed in a cylinder but sufficiently rigid with a high-beam strength to preclude the bending of the sheet material in the direction of the axis of the cylinder;

a fabric covering the circumference of the sheet material for softness of contact between the collar and the neck of a bird to which it is applied; and the upper horizontal end edge of the collar being formed with vertical slots extending therefrom, the vertical slots traversing the linear width of the sheet material, said vertical slots configured for being in contact with the lower neck area of the bird.

8. A new and improved therapeutic collar for birds comprising, in combination:

a sheet material formed in a rectangular configuration having a first vertical end edge, a second vertical end edge, an upper horizontal end edge, a lower horizontal end edge, a front face and a rear face, the sheet material having a linear width and a linear height with the linear width being between 1.8 and 3.0 times the height, the sheet material being formed in a cylindrical configuration with an axis when the first vertical end edges and the second vertical end edge are overlapped and coupled with a fastener means at the opposite end edges for the releasable coupling therebetween, the sheet material being capable of being resilient in its circumference when formed in a cylinder but sufficiently rigid with a high-beam strength to preclude the bending of the sheet material in the direction of the axis of the cylinder;

a fabric covering the circumference of the sheet material for softness of contact between the collar and the neck of a bird to which it is applied; and the fastener means of the collar further comprising a vertical strip of a pile-type fastener adjacent the first vertical end edge of the front face and a plurality of horizontal strips of a pile-type fastener in parallel horizontal plans adjacent to the second vertical end edge of the rear face.

9. A new and improved therapeutic collar for birds comprising, in combination:

a sheet material formed in a rectangular configuration having a first vertical end edge, a second vertical end edge, an upper horizontal end edge, a lower horizontal end edge, a front face and a rear face, the sheet material having a linear width and a linear height with the linear width being between 1.8 and 3.0 times the height, the sheet material being formed in a cylindrical configuration with an axis when the first vertical end edges and the second vertical end edge are overlapped and coupled with a fastener means at the opposite end edges for the releasable coupling therebetween, the sheet material being capable of being resilient in its circumference when formed in a cylinder but sufficiently rigid with a high-beam strength to preclude the bending of the sheet material in the direction of the axis of the cylinder;

a fabric covering the circumference of the sheet material for softness of contact between the collar and the neck of a bird to which it is applied; and the sheet material being formed of individual vertically disposed discrete segments with spaces therebetween, the lower horizontal end edge has extending in a downwardly direction vertical slots, the segments have a width of about $\frac{1}{8}$ inch and a thickness of about $\frac{1}{16}$ inch.

10. The therapeutic collar as set forth in claim 9 wherein the bead having been formed of resilient material capable of bending is covered with the fabric covering the elastomeric member.

11. The therapeutic collar as set forth in claim 9 wherein the vertical slots extending in a downward direction along the lower horizontal end edge, being flexible and having a width of about $\frac{1}{4}$th of an inch, are formed from the fabric covering the sheet material.

* * * * *